US006671286B1

United States Patent
Rinne et al.

(10) Patent No.: US 6,671,286 B1
(45) Date of Patent: Dec. 30, 2003

(54) METHOD AND APPARATUS FOR INDICATING VARIABLE DATA PROCESSING IN TELECOMMUNICATION CONNECTIONS

(75) Inventors: Mikko J. Rinne, Helsinki (FI); Janne Salonen, Oulu (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/296,814

(22) Filed: Apr. 22, 1999

(30) Foreign Application Priority Data

Apr. 27, 1998 (FI) .................................................. 980923

(51) Int. Cl.$^7$ .................................................. H04J 3/16
(52) U.S. Cl. ....................................................... 370/469
(58) Field of Search ................................ 370/466–470, 370/352–353, 402, 389, 260, 349, 232, 206, 395, 230, 390–392; 455/452–455, 426, 509–511; 709/219; 375/316, 332, 220; 712/225, 34, 29, 220; 345/506

(56) References Cited

U.S. PATENT DOCUMENTS

| 4,755,986 A | 7/1988 | Hirata ......................... 370/60 |
| 5,257,257 A | 10/1993 | Chen et al. .................... 370/18 |
| 5,280,481 A | 1/1994 | Chang et al. ............. 370/85.13 |
| 5,394,391 A | 2/1995 | Chen et al. .................... 370/18 |
| 5,396,653 A | 3/1995 | Kivari et al. .................. 455/88 |
| 5,416,435 A | 5/1995 | Jokinen et al. ............... 327/113 |
| 5,420,889 A | 5/1995 | Juntti ........................ 375/346 |
| 5,426,670 A | 6/1995 | Leppanen et al. ........... 375/343 |
| 5,430,740 A | 7/1995 | Kivari et al. ............... 371/37.1 |
| 5,440,597 A | 8/1995 | Chung et al. ............... 375/200 |
| 5,491,718 A | 2/1996 | Gould et al. ................ 375/205 |
| 5,533,013 A | 7/1996 | Leppanen ..................... 370/18 |
| 5,548,616 A | 8/1996 | Mucke et al. ............... 375/295 |
| 5,550,893 A | 8/1996 | Heidari ........................ 379/59 |
| 5,566,201 A | 10/1996 | Ostman ....................... 375/200 |
| 5,570,353 A | 10/1996 | Keskitalo et al. ............ 370/18 |
| 5,577,024 A | 11/1996 | Malkamaki et al. .......... 370/18 |
| 5,579,316 A | 11/1996 | Venters et al. ............ 370/94.1 |
| 5,589,795 A | 12/1996 | Latva-Aho .................. 327/553 |
| 5,590,160 A | 12/1996 | Ostman ....................... 375/367 |
| 5,596,571 A | 1/1997 | Gould et al. ................. 370/335 |
| 5,606,548 A | 2/1997 | Vayrynen et al. ........... 370/252 |
| 5,654,980 A | 8/1997 | Latva-aho et al. ........... 375/208 |

(List continued on next page.)

FOREIGN PATENT DOCUMENTS

| EP | 0 505 284 A1 | 9/1992 |
| EP | 0 635 961 A1 | 1/1995 |
| EP | 0 671 857 A2 | 9/1995 |
| EP | 0 723 355 | 7/1996 |
| EP | 0 831 669 A2 | 3/1998 |
| WO | WO 97/25788 | 7/1997 |
| WO | WO 98/10568 | 3/1998 |

Primary Examiner—Chi Pham
Assistant Examiner—Prenell Jones
(74) Attorney, Agent, or Firm—Perman & Green, LLP

(57) ABSTRACT

Data to be transmitted in a telecommunications system is arranged in frames (100). In order to process the data to be transmitted, a number of mutually optional actions is available. In order to indicate the actions employed in the processing of the data to be transmitted, the transmitting device includes in the frame to be transmitted a predetermined number of control bits (101), the value of said control bits indicating how the transmittable data contained in the frame is processed prior to transmission. In the arrangement according to the invention, there is formed (302) information as regards how many mutually optional actions there are available for processing the data to be transmitted, there is defined (302) the number of control bits contained in the frame, so that the number of actions indicated by the allowed control bit values is at least as high as the number of available, mutually optional actions, and there is included (307) in the frame to be transmitted a predetermined number of control bits.

12 Claims, 3 Drawing Sheets

U.S. PATENT DOCUMENTS

| | | | |
|---|---|---|---|
| D385,887 S | 11/1997 | Park | D14/250 |
| 5,703,873 A | 12/1997 | Ojanpera et al. | 370/332 |
| 5,708,656 A | 1/1998 | Noneman et al. | 370/320 |
| 5,715,279 A | 2/1998 | Laakso et al. | 375/224 |
| 5,726,981 A | 3/1998 | Ylitervo et al. | 370/332 |
| 5,734,645 A | 3/1998 | Raith et al. | 370/329 |
| 5,745,503 A | 4/1998 | Kuusinen | 371/37.1 |
| 5,764,632 A | 6/1998 | Ylitervo | 370/337 |
| 5,790,534 A | 8/1998 | Kokko et al. | 370/335 |
| 5,794,156 A | 8/1998 | Alanara | 455/517 |
| 5,815,801 A | 9/1998 | Hamalainen et al. | 455/63 |
| 5,859,843 A | 1/1999 | Honkasalo et al. | 370/342 |
| 5,881,097 A | 3/1999 | Lilleberg et al. | 375/203 |
| 5,887,252 A | 3/1999 | Noneman | 455/414 |
| 5,968,167 A * | 10/1999 | Whittaker et al. | 712/225 |

* cited by examiner

METHOD AND APPARATUS FOR INDICATING VARIABLE DATA PROCESSING IN TELECOMMUNICATION CONNECTIONS

In general, the invention relates to signalling between the transmitting and the receiving device in wireless telecommunication connections. In particular, the invention relates to how to transmit information in between the receiver and the transmitter as for the changes related to the processing of data to be transmitted over a wireless telecommunications connection, such as code division and channel coding. As an exemplary telecommunications connection, we shall deal with a radio connection between a mobile station and a base station in a third-generation digital cellular radio system.

Many services designed for new wireless telecommunications systems require that the part of the data transmission capacity represented by the radio interface that is reserved for the telecommunications connection transmitting the service can be used in a flexible manner, for example by increasing or reducing channel coding, which affects the user data bitrate achieved in said connection: the more channel coding is used, the slower is the transmission rate of the data proper to be transmitted, and vice versa. The need for changing the channel coding, code division or other such factor used by the transmitter is generally due to the fact that a certain rate of accuracy is attempted to be maintained in the connection irrespective of the changing conditions of the proceeding radio waves. In a system where the data to be transmitted in between the transmitter and the receiver is arranged in frames, each frame may, in an extreme case, contain data that is processed in a different way than in the preceding or the successive frame. In one way or another, the transmitter and the receiver must find mutual understanding as to how the data to be transmitted in each frame has been processed in the transmitter, and consequently how it should be processed in the receiver.

Figure 1:
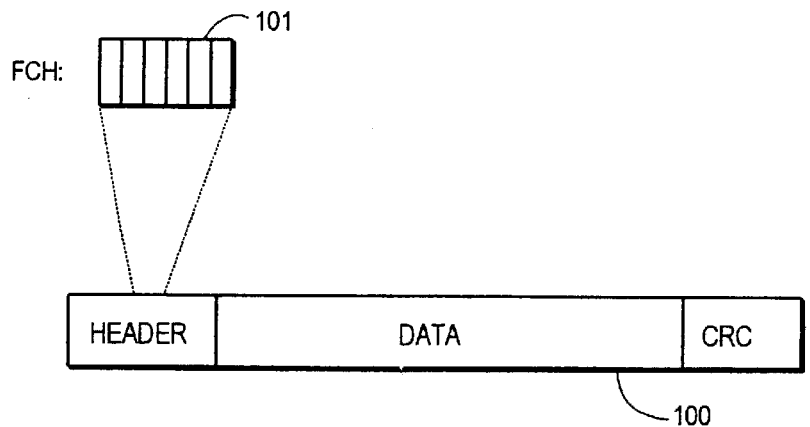

FIG. 1 illustrates a typical prior art frame 100, which is the basic unit of data to be transmitted over a radio interface. In general, the frame includes certain header parts, a certain number of data to be transmitted and a check code for checking the faultlessness of the frame. The header parts can be transmitted through a different logic channel than the data proper. In FIG. 1, among the frame header parts there is particularly illustrated the FCH (Frame Control Header) field 101, containing a given number of bits, for instance 6 or 12 bits. The FCH field can be transmitted for example through a given control channel (DPCCH; Dedicated Physical Control Channel), and the data to be transmitted connected to said frame can be communicated through a data channel (DPDCH; Dedicated Physical Data Channel). The FCH field bits must, among other things, transmit information as to what kind of channel coding, spreading and/or other data processing method has been used in processing the transmittable data connected to the frame in question. In a CDMA (Code Division Multiple Access) system, the FCH field may indicate for instance the value of the processing gain that has been used in connection with the spreading of the data channel.

In prior art frames, the length of the header part is generally attempted to be kept as short as possible in order to be able to use as large a share as possible of the frame for transmitting the data proper. This unavoidably results in that the number of data processing options that can be indicated by means of the FCH field bits illustrated in FIG. 1 is limited. In particular this drawback becomes apparent in situations where in between the transmitter and the receiver, there are several simultaneous but logically separate connections, where the code division or channel coding or other factor connected to data processing may change irrespective or the rest, and where the information related to said connections must be transmitted in the common header field. By means of the FCH field bits, or bits of a corresponding field reserved for this purpose, it should now be possible to indicate a large number of different combinations of data processing options.

A natural alternative for solving the above mentioned problem is to increase the number of bits in the FCH field or in a corresponding field reserved for this purpose. However, it should be noted that it is by no means necessary in all connections to have a large number of different code division options or other data processing connected factors or combinations thereof In a connection where the need of FCH field bits is low, a large number of bits would unnecessarily reduce the relative space reserved for the data to be transmitted and load the system, because the system would try to transmit fully unnecessary bits without transmission errors.

The object of the present invention is to introduce a method and system whereby the problem caused by the number of bits in the above mentioned FCH field or a corresponding field reserved for this purpose can be eliminated.

The invention relates to a method for indicating the actions performed in the processing of the data to be transmitted in a telecommunications system where the transmittable data is arranged in frames and where, in order to process said data, a number of mutually optional actions are available. The method according to the invention comprises a phase where the transmitting device includes in the frame to be transmitted a predetermined number of control bits, and the value of said bits indicates how the transmittable data contained in the frame should be processed prior to transmitting.

The method according to the invention is characterized in that in addition to what was said above, there is defined how many mutually optional actions are available for processing the data to be transmitted, there is defined the number of control bits in the frame, so that the number of actions indicated with the allowed control bit values is at least as high as the number of available, mutually optional actions, and in the frame to be transmitted, there is included a defined number of control bits.

In addition to this, the invention relates to an apparatus for realizing data transmission in a telecommunications system like the one described above. The apparatus according to the invention is characterized in that it comprises means for defining how many mutually optional actions are available for processing the data to be transmitted, and for defining the number of control bits in the frame, so that the number of actions indicated with the allowed control bit values is at least as high as the number of available, mutually optional actions.

In signalling in between the transmitter and the receiver, an exactly correct number of bits is arranged for indicating spreading, channel coding and other corresponding factors connected to data processing, when the bit quantity is not fixed in advance, but the number and allocation of said bits for indicating different factors may vary. In between the transmitter and the receiver, there is provided a mechanism whereby both devices obtain information as to how many bits are used for indicating the factors connected to data processing, and how they are allocated.

One possibility for sending information of the number and allocation of bits to the transmitter and the receiver is to define a certain message to be exchanged between the transmitter and the receiver, said message indicating the existing number and allocation of bits. Another possibility is to establish an unequivocal correspondence between some higher-order concept, such as the QoS, Quality of Service required of the bearer service, or a contributing factor thereof, and the number and allocation of bits. In that case the number and allocation of bits does not have to be separately indicated, but both the transmitting and the receiving device can compute this information as soon as the higher-order concept in question has been agreed upon.

Figure 2:
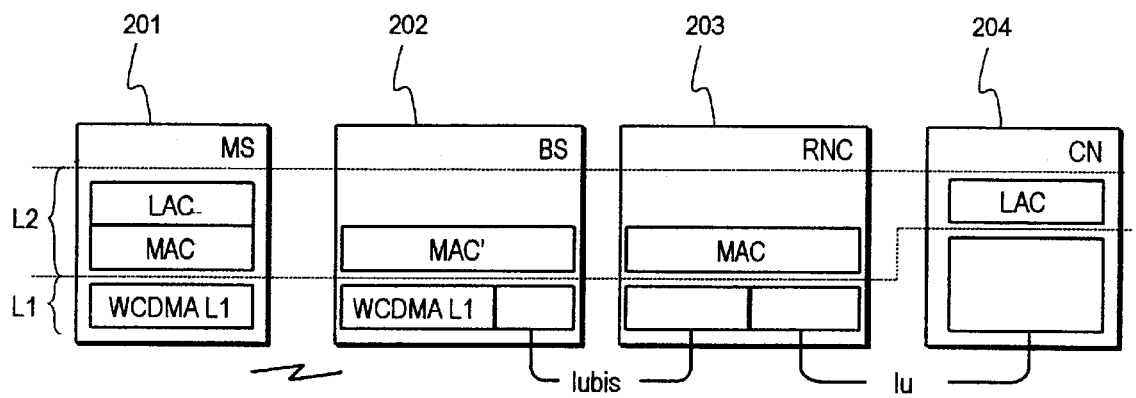
Figure 3:
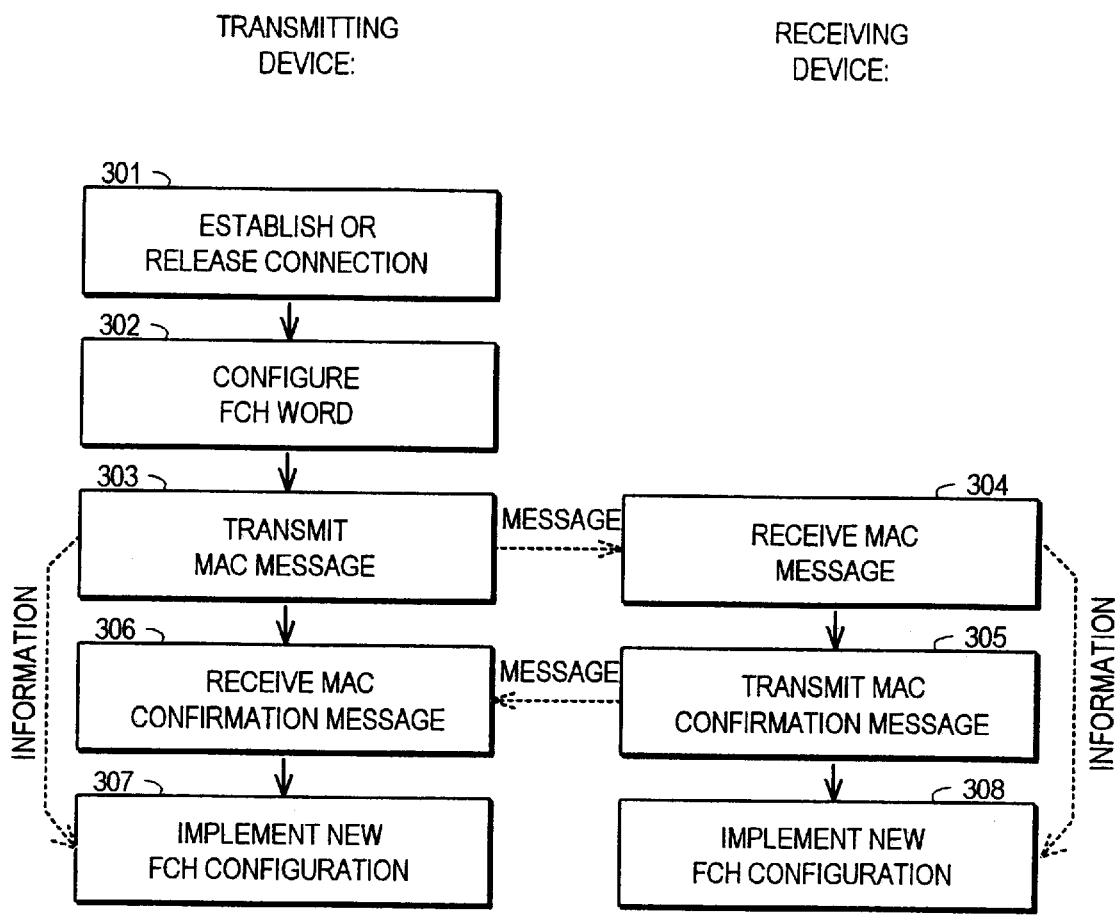
Figure 4:
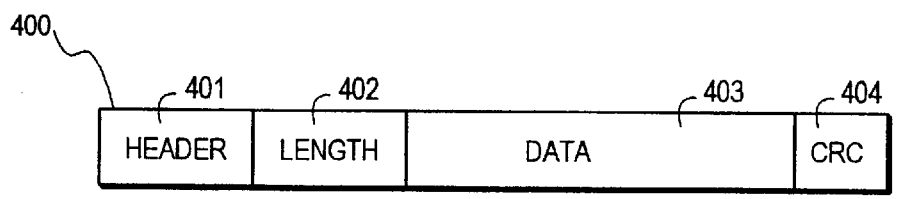
Figure 5:
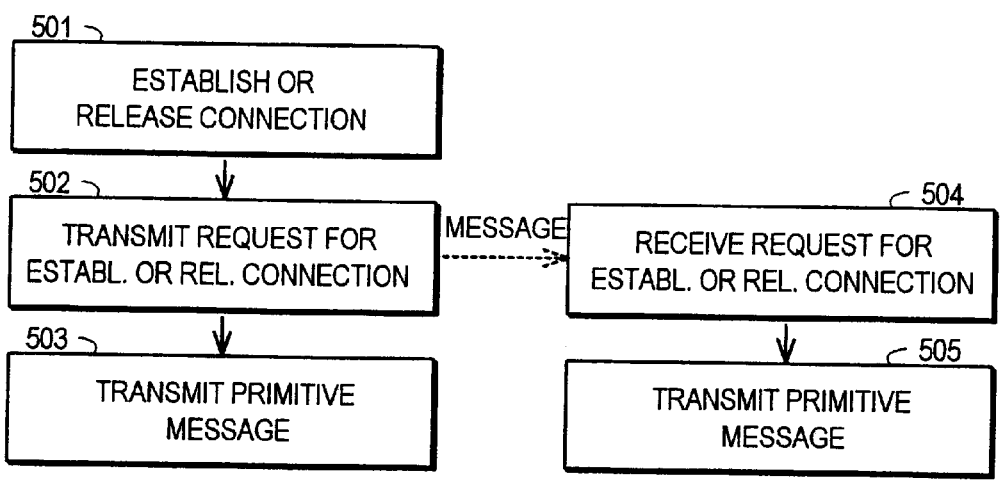
Figure 6:
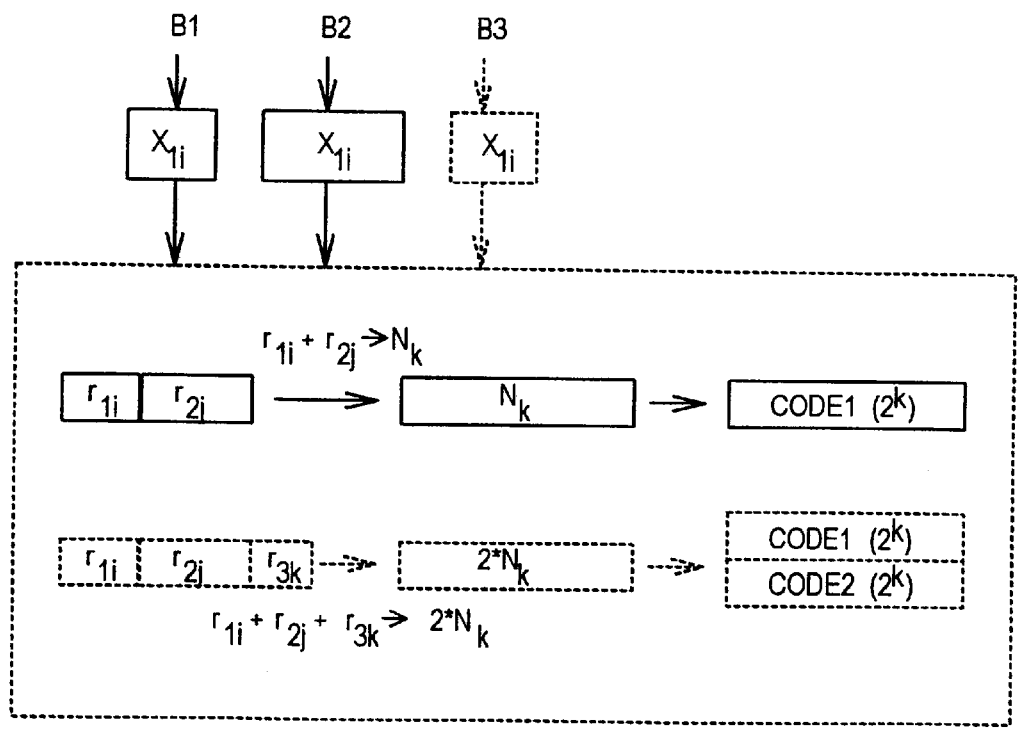

The invention is described in more detail below, with reference to a few preferred embodiments and to the appended drawings, where FIG. 1 illustrates a known frame, FIG. 2 illustrates a suggestion for the structure of a cellular radio system, FIG. 3 illustrates a method according to the invention, FIG. 4 illustrates the structure of the PDU unit used in the method of FIG. 3, FIG. 5 illustrates another method according to the invention, and FIG. 6 illustrates the actions according to the invention.

In the specification above, in connection with the description of the prior art, FIG. 1 was already referred to, and consequently below, in the description of the invention and its preferred embodiments, we shall mainly refer to FIGS. 2–6.

FIG. 2 is a schematical illustration of a known suggestion for a third-generation digital cellular radio system, comprising a mobile station 201, a base station 202, a radio network controller 203 and a core network 204. The lowest protocol layer between the mobile station 201 and the base station 202 is a layer L1. Above it, there is the MAC (Media Access Control) layer, above which the mobile station may further include other layers; the illustration shows the LAC (Link Access Control) layer, which forms the L2 layer in the mobile station together with the MAC layer. The next higher level in the protocol hierarchy is the L3 layer, which is not illustrated in the drawing. In the base station, the role of the MAC layer is partly to intermediate between the layers of the mobile station and the MAC layers of the radio network controller, i.e. it does not in all respects serve as the peer entity of the MAC layers of the controller, wherefore it is marked as MAC'. The physical plane, i.e. the L1 layer located between the base station 202 and the radio network controller 203 is characterized by a so-called Iubis interface in between the base station and the radio network controller. In a respective fashion, there is defined an Iu interface of the physical planes in between the radio network controller 203 and the core network 204. The peer entity of the LAC-U layer of the mobile station is the LAC-U layer of the core network.

In between the mobile station 201 and the network, there may be several simultaneous connections, part of which may be based on a fixed user data and other data processing connected factors with fixed values for the duration of the whole connection, whereas in part of said connections, the user data bitrate and other data processing connected factors may vary during the connection. The invention is particularly related to connections of the latter type, because only then there arises a need to separately indicate how many bits of the FCH field or a corresponding field reserved for this purpose each frame contains, and how they are allocated. The implementation of the invention is not dependent on how many such connections there are in between the mobile station and the network.

For the use of each connection, there is established, in between the mobile station and the base station, a bearer service. Bearer services are defined on the L3 layer of the protocol packets (more exactly on the RBC or Radio Bearer Control layer) by defining for each bearer service a given quality of service which essentially consists of such parameter factors as a primary (and a secondary) bitrate, the highest allowed bit or frame error ratio, the longest allowed delay, the priority of the connection, the applied security level and so on. In connection with the setup of the bearer service, the L3 layer communicates to the MAC layer located underneath it the information—defined on the basis of the quality of service—as to how large a share of the capacity of the transmitting media (in this case the radio interface) the bearer service to be set up requires. On the MAC layer, there is reserved for the bearer service a given share of the total capacity of the radio interface, mainly a given frame transmission timetable and transmission frequency. In some cases several bearer services can also be multiplexed, so that they employ the same frames.

The invention does not restrict the fact as to in which part of the system there is made the decision of how many bits of the FCH field or a corresponding field reserved for this purpose there are employed for indicating how the transmittable data contained in the frame is processed and how said bit values should be interpreted. For the benefit of brevity, said decision can be called the configuration of the FCH field, irrespective of how said field is finally called; the invention does not even require that said bits are all located in the same field. For a start, let us suppose that the FCH field configuration is carried out by the MAC layer of the transmitting device. The FCH field must be reconfigured every time there is established a new such connection that allows a variable user bitrate, or when an old such connection is released. The information of a FCH field reconfiguration must be communicated to the receiving device, and this is carried out in a different manner in the first and second embodiments of the invention.

According to a first embodiment of the invention, the information of a FCH field reconfiguration is communicated as a MAC message between the MAC layers. In the description above we assumed that the FCH field configuration was carried out by the MAC layer of the transmitting device, so that when this assumption prevails, the MAC layer of the transmitting device also composes, in a known fashion, a MAC message containing information of the FCH field reconfiguration and sends it to the receiving device, and the message is interpreted on the MAC layer of the receiving device, and the information of the FCH field reconfiguration is communicated to such parts of the device where it is needed. In order to confirm the transmitting device that the message has gone through, it is advantageously required that the receiving device acknowledges the received MAC message by sending a MAC confirmation message known as such. In an arrangement based on a MAC message and a MAC confirmation message, it is advantageous to bind the implementation of a FCH field reconfiguration to a given frame, in case the frames include a frame number or are otherwise unequivocably identifiable. Said binding of the implementation to a frame means that the transmitting device indicates in its MAC message that the FCH field reconfiguration is applied after frame YY. Here YY is the number of a given frame to be transmitted in the future, the period of time left before its moment of transmission being at least as long as the period needed for the exchange of the MAC message and the MAC confirmation message between the transmitting and the receiving device.

FIG. 3 illustrates the above described first embodiment of the invention. In mode 301, there is established a new connection that allows a variable user bitrate, or an old connection of similar type is released. Simultaneously the receiving device implements the FCH field reconfiguration in mode 308; information as to when mode 308 can be assumed is obtained from mode 304. The receiving device receives the MAC message in mode 304 and transmits a MAC confirmation message in mode 305. After receiving the MAC confirmation message in mode 306, the transmitting device implements a FCH field reconfiguration in mode 307; information as to when mode 307 can be assumed is obtained from mode 304. As a consequence, in mode 302 there is carried out a FCH field reconfiguration, and in mode 303 there is composed and sent a MAC message.

The first embodiment of the invention allows a fair amount of flexibility as regards the spreading, channel coding and other data processing connected factors that can be changed during the connection. Now the task of mapping the data obtained from higher protocol layers to L1-layer bitrates is left for the MAC layer, which requires that in the structure of the PDU (Protocol Data Unit) used on the MAC layer, it is prepared to indicate how large is the share of data obtained from higher protocol layers in each PDU of the MAC layer. FIG. 4 illustrates a suitable structure for a MAC-layer PDU 400, comprising a header 401, a field 402 detecting the PDU length, a data field 403 and a check code 404. The size of the PDU is connected to the use of the FCH field bits, so that the bitrates of the data of separate users indicated by FCH field bits are in fact MAC layer PDU:s of various sizes. Because a MAC-layer PDU is, from the point of view of the higher protocol layers, a transparent structure, the size of the PDU:s can be agreed between the transmitting and the receiving device on the MAC protocol layer. The higher protocol layers send for the MAC layer data packets of optional sizes, among which the MAC layer selects a sufficiently large PDU, which has room for all data to be transmitted.

In the above description it was assumed that in the first embodiment of the invention, the FCH field configuration is carried out by the MAC layer of the transmitting device. However, it can optionally be suggested that the FCH field configuration is always carried out by the MAC layer that is located on the network side, i.e. it is never carried out by the MAC layer of the mobile station. In case the connection is established or released by the initiative of the base station or the radio network controller, the situation does not differ from what was explained above. If, on the other hand, the connection is established or released by the initiative of the mobile station, either the base station or the radio network controller must react to one of the steps in establishing or releasing the connection and carry out the FCH field configuration. The MAC layer of he mobile station can also send to the MAC layer of the base station a particular MAC message, where it requests the reconfiguration of the FCH field. The transmitting and receiving of MAC messages as such represents prior art technique. Irrespective of where the FCH field configuration proper is carried out, information of the process must always be communicated both to the transmitting and the receiving device as double-checked, i.e. so that the device that performed the FCH field configuration receives from the other end a confirmation to the effect that the information of the reconfiguration has been received. A typical communication of the FCH field configuration includes the following elements:

the mobile station identifier, if the communication is sent on a general control channel, the number of FCH bits to be used after configuration, the identifier of the bearer service or those bearer services whereto the FCH field to be configured is connected, as well as information of how the possible bit combinations to be presented in the configured FCH field correspond to each processing method of the data to be transmitted (such as spreading, channel coding, error detection and/or error correction coding, interleaving, data bitrate, etc.

Let us now describe another embodiment of the invention, where the FCH field configuration is based on unequivocal correspondence between some higher-order concept, such as the quality of service required of the bearer service or a contributing factor thereof, and the number and allocation of bits in the FCH field.

In this second embodiment of the invention, there is no need to send or acknowledge a separate MAC-layer message connected to the FCH field configuration, but a consistent understanding of the FCH field configuration is obtained both for the transmitting and receiving device in connection with establishing or releasing the connections. An algorithm that defines the FCH field configuration works most advantageously on the RBC (Radio Bearer Control) layer, and the information of the FCH field configuration is communicated from the RBC layer to the MAC layer in a so-called primitive message, which in general means a message between a higher and a lower protocol layer in the protocol stack. The primitive message may contain essentially the same information as was described above, in connection with a typical FCH field configuration message, although the mobile station identifier (only needed in the base station) and the bearer service identifier are also otherwise communicated in between the RBC layer and the MAC layer. The primitive message can be a message particularly composed for this purpose, or then the same information can be sent as a part of another primitive message, which is known as regards its other parts. The RBC layer of the transmitting device sends the primitive message in question to the MAC layer as a part of a process connected to establishing a new connection or releasing an old one; from the point of view of the invention, it is not essential at which stage of said process the primitive message is sent. In the receiving device, the RBC layer sends a corresponding primitive message to the MAC layer as soon as the RBC layer has received from the RBC layer of the transmitting device a request for establishing or releasing a connection.

FIG. 5 is a schematical illustration of the method according to the second embodiment of the invention. In mode 501, the RBC layer of the transmitting device detects, on the basis of a command obtained from a higher level, that a new connection must be established or an old one released. In mode 502, it sends to the RBC layer of the receiving device a request for establishing a new connection or for releasing an old one. In mode 503 it sends to the MAC layer a primitive message indicating the FCH field configuration after establishing the new connection or releasing the old one. In the receiving device, mode 504 constitutes the receiving of the request for establishing or releasing a connection, sent by the transmitting device, and mode 505 constitutes the sending of a primitive message to the MAC layer.

The second embodiment of the invention differs from the first in that, among others, it does not presuppose the implementation of a new type of a MC-layer PDU structure. On the other hand, said second embodiment of the invention restricts the sending of data packets of various sizes from higher protocol layers to the MAC layer.

In order to facilitate the understanding of the invention, we shall now deal with an exemplary special case. Let us suppose that in between the transmitting and the receiving device, there are two active bearer services, symbolized by B1 and B2. B1 is connected to four possible user bitrates, which are r11, r12, r13 and r14 (more briefly r1$i$, i∈[1,4]). B2 is connected to eight possible user bitrates, which are r2$i$, i∈[1,8]. Two of the FCH field bits are allocated to indicating the user data bitrate B1, and three are allocated to indicate the user data bitrate of B2. There are 32 possible bitrate combinations. Let us assume that in the system, there is applied biorthogonal coding, where the coding length is 64 different values. If the FCH field value is expressed by one codeword, then for expressing 32 bitrate combinations there are needed half of all values of the codeword. It is advantageous to provide the allowed codeword values for the information of both the transmitting and the receiving device in order to ensure that the receiving device can improve the probability of successful decoding by accepting allowed codeword values only.

Let us next assume that in between the transmitting and the receiving device, it is desired, by the initiative of the L3 layer, to establish a third bearer service which is symbolized by B3 and which has four possible user bitrates, i.e. r3$i$, i∈[1,4]. For detecting all bitrate combinations, there are now needed 7 bits, because there are altogether 128 different bitrate combinations. For indicating the contents of the reconfigured FCH field, on the MAC layer there must be added another codeword with the length of 32, in case the coding rate of the biorthogonal coding is not desired to be changed. The FCH field bits and the codewords used to indicate them could be interconnected, so that six FCH field bits were indicated by means of a first codeword (so that all 64 values of the first codeword were available) and one FCH field bit were indicated by means of a second codeword (so that only two possible values of the second codeword were available). However, the probability of successful decoding is higher, if the FCH field bits are connected to the respective codewords so that the maximum number of bits to be connected to one codeword is as small as possible. Consequently, in this case the first codeword is used for indicating four FCH field bits, and the second codeword is used for indicating three FCH field bits, or vice versa. Thus the allowed codeword values must be known to the receiving device. Owing to an improved probability of success, a lower transmission power can be applied.

FIG. 6 is a schematical illustration of the example described above. Transmittable bits connected to a given bearer service are marked with the symbol $x_{ij}$. For a start, the bearer services B1 and B2 share a common code channel, so that by means of repetition, the bitrates $r_{1i}$ and $r_{2j}$ produce the maximum quantity of data $N_k$ that can be transmitted in one frame (having the length of for instance 10 ms), when one coding channel and one spreading factor $2^k$ is employed. When there is added the bearer service B3, the largest possible number of bitrate combinations exceeds the capacity of one code channel, wherefore another code channel is needed. By means of unequal repetition, the bitrates $r_{1i}$, $r_{2j}$ and $r_{3k}$ yield the data quantity of $2N_k$, which can be transmitted within one frame, when there are employed two code channels and the spreading factor $2^k$.

It was already pointed out that the invention is not restricted to bitrate description, but in similar fashion the frame to be transmitted can include information of any possible factor connected to the data to be transmitted. By way of example, let us deal with a situation where two bits of the FCH field or a corresponding field reserved for said purpose are used for indicating how many user data bits are contained in said frame and what is the coding rate used in the coding of the user data bits. The table below presents a possible way to define the mutual dependencies between the FCH field bit values and the user data bit quantities and coding rates.

| FCH bits | User data bit quantity in the frame | Coding rate |
| --- | --- | --- |
| 00 | 1000 | 0.5 |
| 01 | 1000 | 0.25 |
| 10 | 2000 | 0.5 |
| 11 | 2000 | 0.25 |

The transmitting and the receiving device according to the invention differ from prior art devices in that they are provided to use in the frame variable numbers of bits of the FCH field or another field reserved for said purpose according to how many such optional actions the transmitting device has for processing the data to be transmitted that their utilization must be informed to the receiving device. In case the above described first embodiment of the invention is applied, the MAC layer of the transmitting device is provided to form PDU:s of variable sizes and to indicate the size of the employed PDU:s; respectively, the MAC layer of the receiving device is provided to interpret from the frame what sizes of PDU:s it contains and to decode the received PDU:s of various sizes and to transmit the information contained therein to higher protocol layers. Moreover, the MAC layers of the transmitting and the receiving device are provided to process MAC messages concerning the configuration of the FCH field according to the method described above. If the second embodiment of the invention is applied, the RBC layers of both the transmitting and the receiving device are provided to compose and communicate to the MAC layer a primitive message indicating the FCH field configuration.

Obviously the above described preferred embodiments of the invention are presented by way of example only, and they do not restrict the invention.

What is claimed is:

1. A method for indicating processing methods selected from available mutually optional processing methods used in the processing of data to be transmitted by a transmitting device in a telecommunications system where the data to be transmitted is arranged in frames (100), comprising a phase where the transmitting device includes in the frame to be transmitted a number of control bits (101), the value of said bits indicating a data processing method used to process the transmittable data contained by the frame prior to transmission, characterized in that it also comprises phases where there is formed (302) information of how many available mutually optional processing methods there are for processing the data to be transmitted, there is defined (302) the number of control bits in the frame so that the number of selected data processing methods to be indicated by allowed values of the control bits is at least as high as the number of available mutually optional processing methods, and there is included (307) the defined number of control bits in the frame to be transmitted.

2. A method according to claim 1, characterized in that in order to form identical information both in the transmitting and the receiving device as regards how many control bits the frame includes and how the allowed values of the control bits are interpreted, the transmitting device sends (303) to the receiving device a message where said facts are indicated.

3. A method according to claim 2, characterized in that said message is a MAC-layer message between MAC protocol layers.

4. A method for indicating processing methods selected from available mutually optional processing methods used in the processing of data to be transmitted by a transmitting device in a telecommunications system where the data to be transmitted is arranged in frames, comprising phases where the transmitting device includes in the frame to be transmitted a number of control bits, the value of said bits indicating how the transmittable data contained by the frame has been processed prior to transmission, there is formed information of how many available mutually optional processing methods there are for processing the data to be transmitted, there is defined the number of control bits in the frame so that the number of selected processing methods to be indicated by allowed values of the control bits is at least as high as the number of available mutually optional processing methods, there is included the defined number of control bits in the frame to be transmitted, the transmitting device sends a MAC-layer message between MAC protocol layers to a receiving device that includes how many control bits the frame includes and how the allowed values of the control bits are interpreted, the protocol layer located above the MAC layer of the transmitting device indicates for the MAC layer the limits within which the employed user data bitrate can vary, the MAC layer of the transmitting device sends to the MAC layer of the receiving device a MAC message indicating how many mutually optional MAC-layer PDU:s there can be used in the connection, the MAC layer of the transmitting device receives from the protocol layer located above it a data packet, the MAC layer of the transmitting device selects a MAC-layer PDU that can accommodate the user data contained in the received data packet, and the MAC layer of the transmitting device indicates for the receiving device the size of the MAC-layer PDU used in the frame to be transmitted.

5. A method for indicating processing methods selected from available mutually optional processing methods used in the processing of data to be transmitted by a transmitting device in a telecommunications system where the data to be transmitted is arranged in frames, comprising phases where the transmitting device includes in the frame to be transmitted a number of control bits, the value of said bits indicating how the transmittable data contained by the frame has been processed prior to transmission, there is formed information of how many available mutually optional processing methods there are for processing the data to be transmitted, there is defined the number of control bits in the frame so that the number of selected processing methods to be indicated by allowed values of the control bits is at least as high as the number of available mutually optional processing methods, there is included the defined number of control bits in the frame to be transmitted, and in order to form identical information both in the transmitting and the receiving device as regards how many control bits are contained in the frame and how the allowed control bit values are interpreted, there is established an unequivocal correspondence in between a predetermined higher-order concept and the number and allocation of the control bits.

6. A method according to claim 5, characterized in that said higher-order concept is the quality of service required of the bearer service employed by the telecommunications connection between the transmitting and the receiving device.

7. A method according to claim 5, characterized in that the RBC protocol layer of the transmitting device sends information of said higher-order concept in a primitive message (503) to the MAC layer as a part of the process connected to establishing a new connection or releasing an old one, and the RBC protocol layer of the receiving device sends the corresponding information in a primitive message (505) to the MAC layer as soon as the RBC protocol layer has received from the RBC protocol layer of the transmitting device a request for establishing or releasing a connection.

8. A transmitting device for realising data transmission in a telecommunications system, where the data to be transmitted is arranged in frames (100), and where, in order to process the data to be transmitted, there is available a number of mutually optional processing methods comprising means for including in the frame to be transmitted such control bits (101), the value of which indicates how the data contained in the frame has been processed prior to transmission, characterized in that it comprises means for forming information (302) as regards how many mutually optional processing methods are available for processing the data to be transmitted, and for defining the number of control bits (302) contained in the frame, so that a number of processing methods selected from the available mutually optional processing methods indicated with the allowed control bit values is at least as high as the number of available mutually optional processing methods.

9. The method of claim 1, wherein the mutually optional processing methods include at least one of spreading, channel coding, error correction coding, error detection, interleaving, and data bitrate.

10. A method for indicating processing methods for data transmitted in a frame in a telecommunications system, the method comprising:

defining bit combinations that each correspond to a data processing method for processing the data;

defining a number of control bits in the frame to accommodate at least the defined bit combinations, wherein the control bits in the frame include at least one of the defined bit combinations indicating the data processing method applied to the data prior to transmission.

11. The method of claim 10, further comprising transmitting a message including the defined number of control bits in the frame and the defined bit combinations and their corresponding processing methods, in order to provide identical information to a transmitting device and a receiving device of the telecommunications system.

12. The method of claim 10, wherein the processing methods include at least one of spreading, channel coding, error correction coding, error detection, interleaving, and data bitrate.

* * * * *